(12) United States Patent
Yonezawa et al.

(10) Patent No.: US 11,359,565 B2
(45) Date of Patent: Jun. 14, 2022

(54) HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/842,137

(22) Filed: Apr. 7, 2020

(65) Prior Publication Data
US 2020/0325839 A1  Oct. 15, 2020

(30) Foreign Application Priority Data

Apr. 9, 2019  (JP) .............................. JP2019-074117

(51) Int. Cl.
*F02D 41/02* (2006.01)
*B60K 6/24* (2007.10)
(Continued)

(52) U.S. Cl.
CPC ............ *F02D 41/0255* (2013.01); *B60K 6/24* (2013.01); *B60K 6/365* (2013.01); *F01N 3/24* (2013.01);
(Continued)

(58) Field of Classification Search
CPC .............. F02D 41/0255; F02D 41/024; F02D 41/0007; F02D 2200/0802; B60K 6/24; B60K 6/365; F02B 37/183; F01N 3/24; F01N 3/2006; F01N 9/00; F01N 11/00; F01N 13/087; F01N 13/009; F01N 2240/36; F01N 2410/00; F01N 2900/1602;
(Continued)

(56) References Cited

U.S. PATENT DOCUMENTS 9,995,228 B2 * 6/2018 Zhang ................. F02D 41/0007
10,125,671 B2 * 11/2018 Alvarez ................ F02B 37/183
(Continued)

FOREIGN PATENT DOCUMENTS

CN    104053888 A    9/2014
JP    2015-058924 A  3/2015

*Primary Examiner* — Audrey B. Walter
*Assistant Examiner* — Dapinder Singh
(74) *Attorney, Agent, or Firm* — Sughrue Mion, PLLC (57) ABSTRACT

When it is determined that control of warm-up of a catalyst is necessary at the time of start of an engine, an ECU starts warm-up control. Initially, the ECU performs first processing for a first set time period. In the first processing, the ECU sets the engine to an idle state and fully opens a waste gate valve. When the first set time period has elapsed since the first processing was started, the ECU performs second processing. In the second processing, the ECU sets the engine to a prescribed rotation speed and fully closes the waste gate valve. When a second set time period has elapsed since the second processing was started, the ECU quits the second processing and quits warm-up control.

5 Claims, 8 Drawing Sheets

(51) Int. Cl.
*F02B 37/18* (2006.01)
*F01N 3/24* (2006.01)
*B60K 6/365* (2007.10)

(52) U.S. Cl.
CPC ......... *F02B 37/183* (2013.01); *B60Y 2200/92* (2013.01); *B60Y 2300/192* (2013.01); *B60Y 2400/435* (2013.01); *F02D 2200/0802* (2013.01)

(58) Field of Classification Search
CPC ............. F01N 2340/06; F01N 2590/11; B60Y 2300/192; B60Y 2400/435; Y02T 10/12; Y02A 50/20
USPC ..................................................... 60/280, 602
See application file for complete search history.

(56) References Cited

U.S. PATENT DOCUMENTS

| | | | |
|---|---|---|---|
| 2002/0134072 A1* | 9/2002 | Fujieda | F02D 41/0235 60/280 |
| 2011/0270511 A1* | 11/2011 | Kurtz | F02D 41/0055 701/105 |
| 2012/0240571 A1* | 9/2012 | Otsuka | F02D 41/0235 60/601 |
| 2014/0325983 A1 | 11/2014 | Tsunooka | |
| 2016/0040618 A1* | 2/2016 | Idogawa | F02D 41/3005 701/104 |
| 2018/0119606 A1* | 5/2018 | Hosoya | F01N 11/002 |
| 2018/0297464 A1* | 10/2018 | Beck | B60K 6/365 |

\* cited by examiner

HYBRID VEHICLE

This nonprovisional application is based on Japanese Patent Application No. 2019-074117 filed with the Japan Patent Office on Apr. 9, 2019, the entire contents of which are hereby incorporated by reference.

BACKGROUND

Field

The present disclosure relates to a hybrid vehicle.

Description of the Background Art

Japanese Patent Laying-Open No. 2015-58924 discloses a hybrid vehicle including a catalyst that purifies exhaust in an exhaust passage of an internal combustion engine.

SUMMARY

For example, in a state that a temperature of a catalyst is low (for example, around a room temperature) as represented by a state at the start of an internal combustion engine, the catalyst is desirably warmed up and activated early. Therefore, the internal combustion engine may be activated for a certain time period so that exhaust from the internal combustion engine warms up the catalyst.

When the internal combustion engine is activated, exhaust emitted from each cylinder of the internal combustion engine flows into the exhaust passage from an exhaust manifold and flows into the catalyst from an upstream-side end surface of the catalyst provided in the exhaust passage. At this time, exhaust emitted from each cylinder does not always evenly flow to the entire region of the upstream-side end surface of the catalyst. Depending on positional relation between each cylinder of the internal combustion engine and the exhaust manifold or a shape of the exhaust passage, there may be a region where a flow rate of exhaust that flows in is relatively high and a region where a flow rate of exhaust that flows in is relatively low in the upstream-side end surface of the catalyst. Therefore, there may be a region where the catalyst is not activated in the upstream-side end surface of the catalyst.

When there is a region where the catalyst has not been activated at the time point of end of warm-up of the catalyst, there may be a period for which some of exhaust from the engine that may subsequently increase cannot appropriately be purified and exhaust purification performance may be lowered.

The present disclosure was made to solve the problem above, and an object thereof is to suppress uneven activation of a catalyst that purifies exhaust.

(1) A hybrid vehicle according to the disclosure includes an internal combustion engine including a turbocharger, a catalyst that purifies exhaust, the catalyst being provided in an exhaust passage downstream from a turbine of the turbocharger, a bypass passage that is branched from the exhaust passage upstream from the turbine, bypasses the turbine, and is merged with the exhaust passage upstream from the catalyst, a waste gate valve that regulates a flow rate of exhaust that flows through the bypass passage, and a controller that performs warm-up control for warming up the catalyst at the time of start of the internal combustion engine. Warm-up control includes first processing and second processing. In the first processing, the controller sets the internal combustion engine to an idle state and the waste gate valve is controlled to first opening or larger. In the second processing after the first processing, the controller increases a rotation speed of the internal combustion engine and rotates the turbine by controlling the waste gate valve to second opening or smaller, the second opening being smaller than the first opening.

In the first processing, while the internal combustion engine is idle, that is, while a flow rate of exhaust is low, the waste gate valve is controlled to first opening or larger. As the waste gate valve is controlled to first opening or larger, exhaust flows to the catalyst through the bypass passage. Since exhaust bypasses the turbine, a large quantity of heat of exhaust that flows to the catalyst can be maintained. Since the flow rate of exhaust is low, a flow velocity of exhaust that flows to the catalyst through the bypass passage is low. Since linearity is high when the flow velocity is high, exhaust may locally flow from an upstream-side end surface of the catalyst. When the flow velocity is low, however, exhaust flows from the upstream-side end surface of the catalyst as spreading over a certain range. Therefore, an upstream-side region of the catalyst can relatively uniformly be activated.

In the second processing, the rotation speed of the internal combustion engine is made higher than in the idle state. Even though a flow rate of exhaust increases in the second processing, the upstream-side region of the catalyst has relatively uniformly been activated in the first processing, and therefore exhaust at the time of start of the second processing can appropriately be purified. When second processing high in flow rate of exhaust is initially performed, at the time of start of second processing, much exhaust passes before activation of the catalyst, and hence there is a concern about lowering in exhaust purification performance. By initially performing first processing to activate the catalyst in an amount allowing appropriate purification of exhaust at the time of start of second processing, high exhaust purification performance can be maintained.

In the second processing, the turbine is rotated with the waste gate valve being controlled to second opening (<first opening) or smaller. As the turbine is rotated, exhaust flows to the catalyst as a swirl. As exhaust swirls, exhaust can flow to the catalyst without locally flowing thereto even though a flow velocity of exhaust is increased. Uneven activation of the catalyst can thus be suppressed.

For example, even though a request for driving force by an operation of an accelerator by a user or the like is issued while first processing is being performed, a hybrid vehicle would be able to secure driving force from another drive source (for example, electric power from a power storage). Response to the operation of the accelerator by the user can be made while first processing is continued with the flow rate of exhaust being low, so that deterioration in drivability can be suppressed.

(2) In one embodiment, the hybrid vehicle further includes a rotating electric machine and a planetary gear mechanism to which the internal combustion engine, the rotating electric machine, and an output shaft are connected. In the second processing, the controller increases the rotation speed of the internal combustion engine by controlling the rotating electric machine.

According to the configuration, the rotation speed of the internal combustion engine can be increased by controlling the rotating electric machine.

(3) In one embodiment, the second processing is performed after the first processing is performed for a prescribed time period. The prescribed time period is set based on a quantity of heat introduced into the catalyst in the first processing.

The prescribed time period is set, for example, to a time period within which a quantity of heat required for warming up the catalyst in an amount allowing purification of exhaust at the time of start of second processing can be introduced into the catalyst in first processing. For example, a quantity of heat introduced into the catalyst in first processing can be calculated based on a duration of first processing and a temperature of exhaust. By determining a quantity of heat introduced into the catalyst in first processing, a prescribed time period which is the duration of first processing can be set. By switching from first processing to second processing at the time when a quantity of heat required for warm-up of the catalyst in an amount allowing purification of exhaust at the time of start of second processing has been introduced in first processing, switching to second processing high in flow rate of exhaust can be made at appropriate timing. Therefore, a time period required for warm-up of the entire catalyst can be reduced. In other words, warm-up control can be made more efficient while purification performance is ensured.

(4) In one embodiment, the hybrid vehicle further includes a temperature sensor that detects a temperature of the catalyst on an upstream side. When a detection value from the temperature sensor exceeds a threshold temperature during the first processing, the controller performs the second processing.

By providing a temperature sensor that detects a temperature of the catalyst on the upstream side, a state of warm-up of the catalyst on the upstream side can be known while first processing is performed. By performing second processing at the time when a detection value from the temperature sensor exceeds a threshold temperature, that is, warm-up of the catalyst on the upstream side is completed, exhaust at the time of start of second processing can appropriately be purified. Completion of warm-up of the catalyst on the upstream side means, for example, activation of the catalyst in an amount allowing purification of exhaust at the time of start of second processing. By switching between first processing and second processing as above, switching to second processing high in flow rate of exhaust can be made at appropriate timing. Therefore, a time period required for warm-up of the entire catalyst can be reduced.

In other words, warm-up control can be made more efficient while purification performance is ensured.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram showing an exemplary ECU of the hybrid vehicle shown in

FIG. 1.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

<Overall Configuration>

Figure 1:
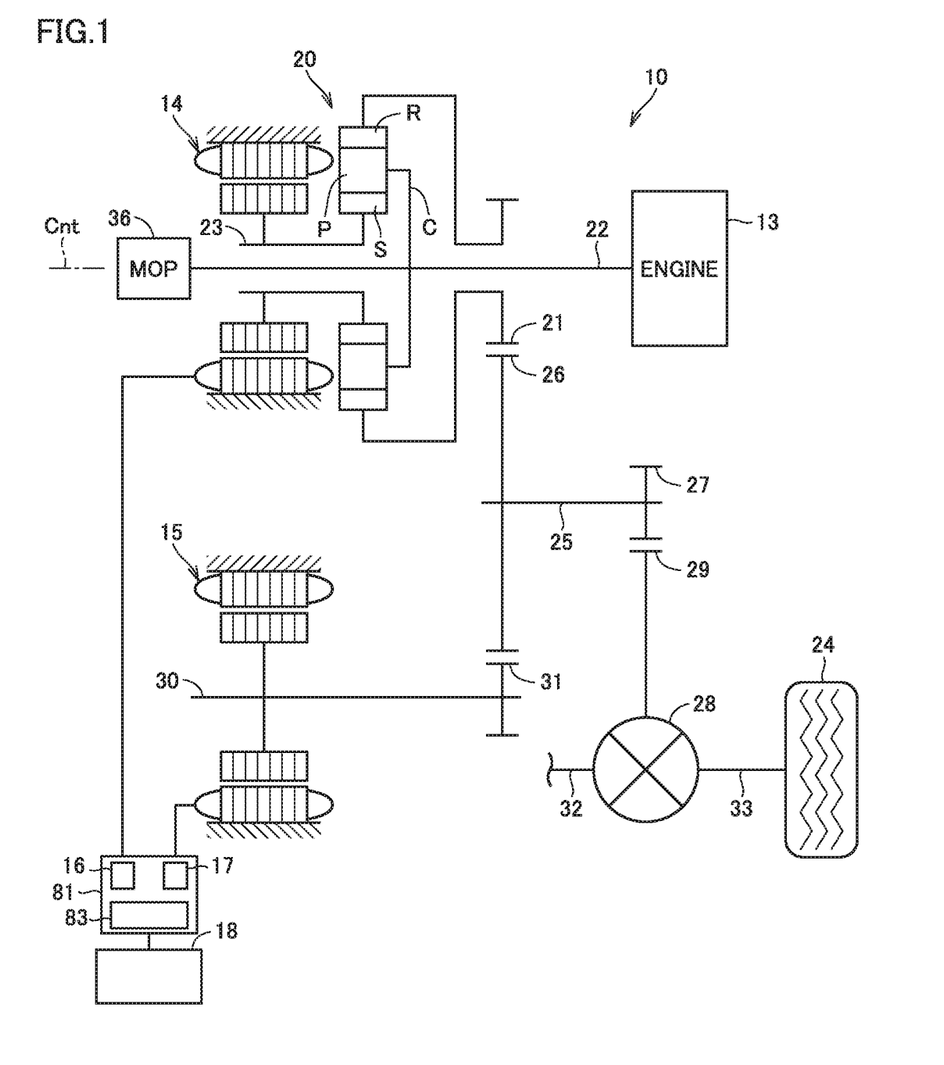
FIG. 1 is an overall configuration diagram showing an exemplary hybrid vehicle according to a first embodiment.

FIG. 1 is an overall configuration diagram showing an exemplary hybrid vehicle according to a first embodiment. Referring to FIG. 1, this hybrid vehicle (which is also simply referred to as a "vehicle" below) 10 includes an engine 13, a first motor generator (which is also referred to as a "first MG" below) 14, a second motor generator (which is also referred to as a "second MG" below) 15, and a planetary gear mechanism 20.

First MG 14 and second MG 15 each perform a function as a motor that outputs torque by being supplied with driving electric power and a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a power storage 18 with a power control unit (PCU) 81 being interposed. PCU 81 includes a first inverter 16 that supplies and receives electric power to and from first MG 14, a second inverter 17 that supplies and receives electric power to and from second MG 15, and a converter 83.

Converter 83 supplies and receives electric power to and from power storage 18 as well as first inverter 16 and second inverter 17. For example, converter 83 can up-convert electric power from power storage 18 and supply up-converted electric power to first inverter 16 or second inverter 17. Alternatively, converter 83 can down-convert electric power supplied from first inverter 16 or second inverter 17 and supply down-converted electric power to power storage 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges power storage 18 with electric power generated by first MG 14 or second MG 15 or drives first MG 14 or second MG 15 with electric power from power storage 18.

Power storage 18 is mounted on vehicle 10 as a drive power supply (that is, a motive power source) of vehicle 10. Power storage 18 includes a plurality of stacked batteries. Examples of the battery include secondary batteries such as a nickel metal hydride battery and a lithium ion battery. The battery may be a battery containing a liquid electrolyte between a positive electrode and a negative electrode or a battery containing a solid electrolyte (an all-solid-state battery). Power storage 18 should only be a rechargeable DC power supply, and a large-capacity capacitor can also be adopted.

Engine 13 and first MG 14 are coupled to planetary gear mechanism 20. Planetary gear mechanism 20 transmits output torque of engine 13 by dividing output torque into output torque to first MG 14 and output torque to an output gear 21. Planetary gear mechanism 20 includes, for example, a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Engine 13 has output shaft 22 coupled to carrier C. A rotor shaft 23 of first MG 14 is coupled to sun gear S. Ring gear R is coupled to output gear 21.

Carrier C to which output torque of engine 13 is transmitted functions as an input element, ring gear R that outputs torque to output gear 21 functions as an output element, and sun gear S to which rotor shaft 23 of first MG 14 is coupled functions as a reaction force element. Namely, planetary gear mechanism 20 divides output from engine 13 into output on a side of first MG 14 and output on a side of output gear 21. First MG 14 is controlled to output torque in accordance with output torque of engine 13.

A countershaft 25 is arranged in parallel to axis Cnt. Countershaft 25 is provided with a driven gear 26 meshed with output gear 21. A drive gear 27 is further provided in countershaft 25, and drive gear 27 is meshed with a ring gear 29 in a differential gear 28. A drive gear 31 provided in a rotor shaft 30 of second MG 15 is meshed with driven gear 26. Therefore, output torque of second MG 15 is added to torque output from output gear 21 in driven gear 26. Torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is also referred to as an "MOP" below) 36 is provided coaxially with output shaft 22 of engine 13. MOP 36 delivers lubricating oil with a cooling function, for example, to planetary gear mechanism 20, first MG 14, second MG 15, and differential gear 28.

<Configuration of Engine>

Figure 2:
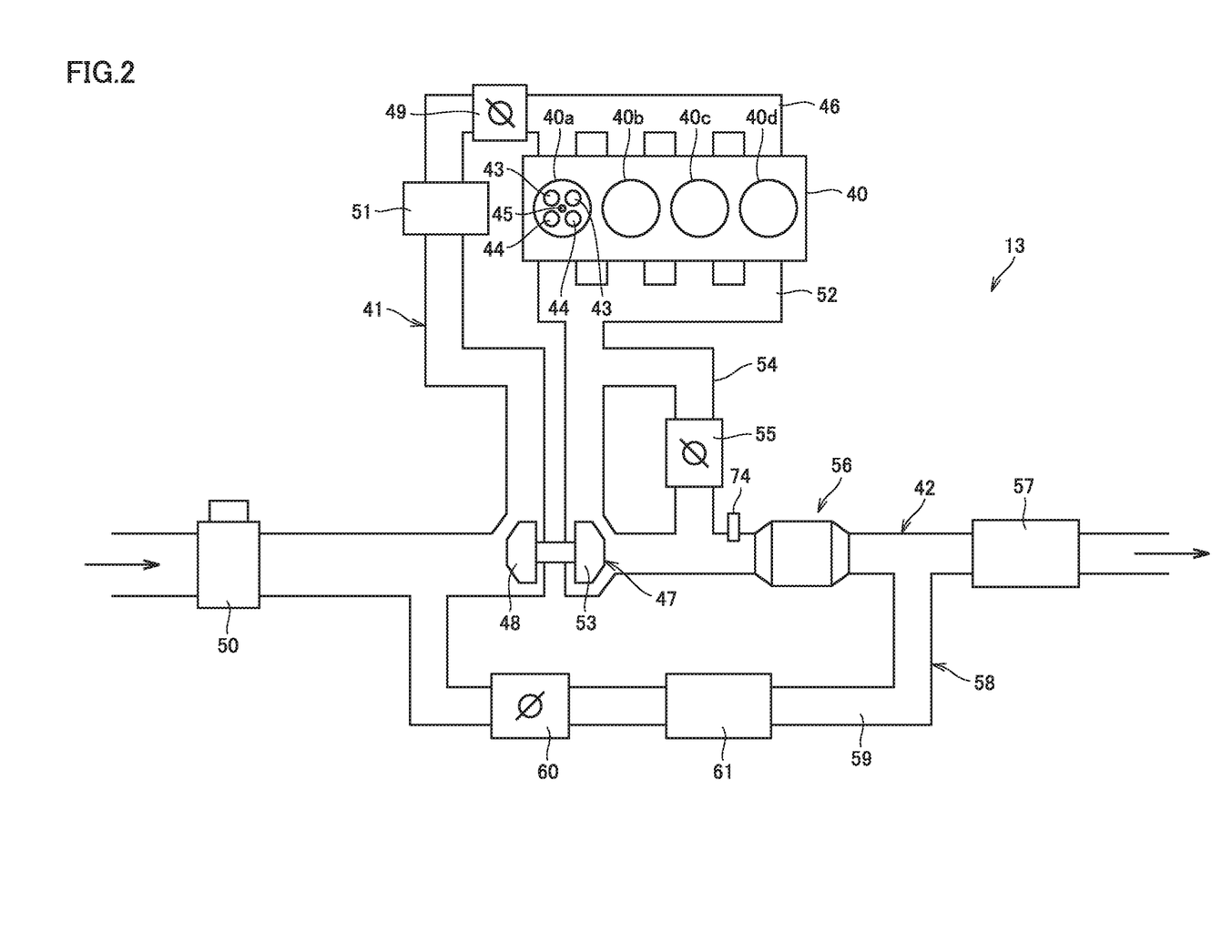
FIG. 2 is a diagram showing an exemplary configuration of an engine.

FIG. 2 is a diagram showing an exemplary configuration of engine 13. Referring to FIG. 2, engine 13 is, for example, an in-line four-cylinder spark ignition internal combustion engine including a turbocharger 47. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d. One end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

Engine 13 according to the first embodiment is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valve 43, exhaust valve 44, and ignition plug 45 provided in other cylinders 40b, 40c, and 40d.

Engine 13 is provided with turbocharger 47 that uses exhaust energy to boost suctioned air. Turbocharger 47 includes a compressor 48 and a turbine 53.

An intake air passage 41 has one end connected to intake manifold 46 and the other end connected to an air inlet. Compressor 48 is provided at a prescribed position in intake air passage 41. An air flow meter 50 that outputs a signal in accordance with a flow rate of air that flows through intake air passage 41 is provided between the other end (air inlet) of intake air passage 41 and compressor 48. An intercooler 51 that cools intake air pressurized by compressor 48 is disposed in intake air passage 41 provided downstream from compressor 48. A throttle valve 49 that can regulate a flow rate of intake air that flows through intake air passage 41 is provided between intercooler 51 and intake manifold 46.

An exhaust passage 42 has one end connected to exhaust manifold 52 and the other end connected to a muffler (not shown). Turbine 53 is provided at a prescribed position in exhaust passage 42. In exhaust passage 42, a bypass passage 54 that bypasses exhaust upstream from turbine 53 to a portion downstream from turbine 53 and a waste gate valve 55 provided in the bypass passage and capable of regulating a flow rate of exhaust guided to turbine 53 are provided. Therefore, a flow rate of exhaust that flows into turbine 53, that is, a boost pressure of suctioned air, is regulated by controlling a position of waste gate valve 55.

Exhaust that passes through turbine 53 or waste gate valve 55 flows into a catalyst converter 56 and an aftertreatment apparatus 57 provided at prescribed positions in exhaust passage 42, and is purified by catalyst converter 56 and aftertreatment apparatus 57 and thereafter emitted into the atmosphere.

Catalyst converter 56 contains, for example, a three-way catalyst. The three-way catalyst purifies nitrogen oxide (NOx), carbon monoxide (CO), and unburned hydrocarbon (HC) contained in exhaust that flows into exhaust passage 42 from engine main body 40. The three-way catalyst reduces NOx to nitrogen and oxygen in the presence of reducing gas ($H_2$, CO, or hydrocarbon). The three-way catalyst oxidizes carbon monoxide to carbon dioxide in the presence of oxidizing gas. The three-way catalyst oxidizes unburned hydrocarbon (HC) to carbon dioxide and water in the presence of oxidizing gas. For efficient oxidation or reduction by the three-way catalyst, combustion (stoichiometric combustion) at a stoichiometric air-fuel ratio (stoichiometry) in which fuel is completely burnt and there is no excess oxygen in engine main body 40 is desirable.

Aftertreatment apparatus 57 is such an apparatus that a function of the three-way catalyst is added to a GPF representing a filter that collects PM contained in exhaust. Aftertreatment apparatus 57 purifies HC, CO, and NOx which could not be purified by catalyst converter 56 and collects PM contained in exhaust. PM deposited in the GPF is burnt as a result of flow-in of exhaust at a temperature equal to or higher than a burning temperature of PM, gasified to carbon dioxide or the like, and then removed. Catalyst converter 56 can also be such an apparatus that a function of the three-way catalyst is added to a GPF.

Engine 13 is provided with an exhaust gas recirculation (EGR) apparatus 58 that has exhaust flow into intake air passage 41. EGR apparatus 58 includes an EGR passage 59, an EGR valve 60, and an EGR cooler 61. EGR passage 59 allows some of exhaust to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between catalyst converter 56 and aftertreatment apparatus 57 to a portion of intake air passage 41 between compressor 48 and air flow meter 50.

An exhaust temperature sensor 74 that detects a temperature of exhaust is provided downstream from a portion of merge of exhaust that passes through turbine 53 and waste gate valve 55 and upstream from catalyst converter 56. Exhaust temperature sensor 74 detects a temperature of exhaust that flows to catalyst converter 56. Exhaust temperature sensor 74 outputs a signal indicating a result of detection to ECU 11.

<Configuration of Controller>

Figure 3:
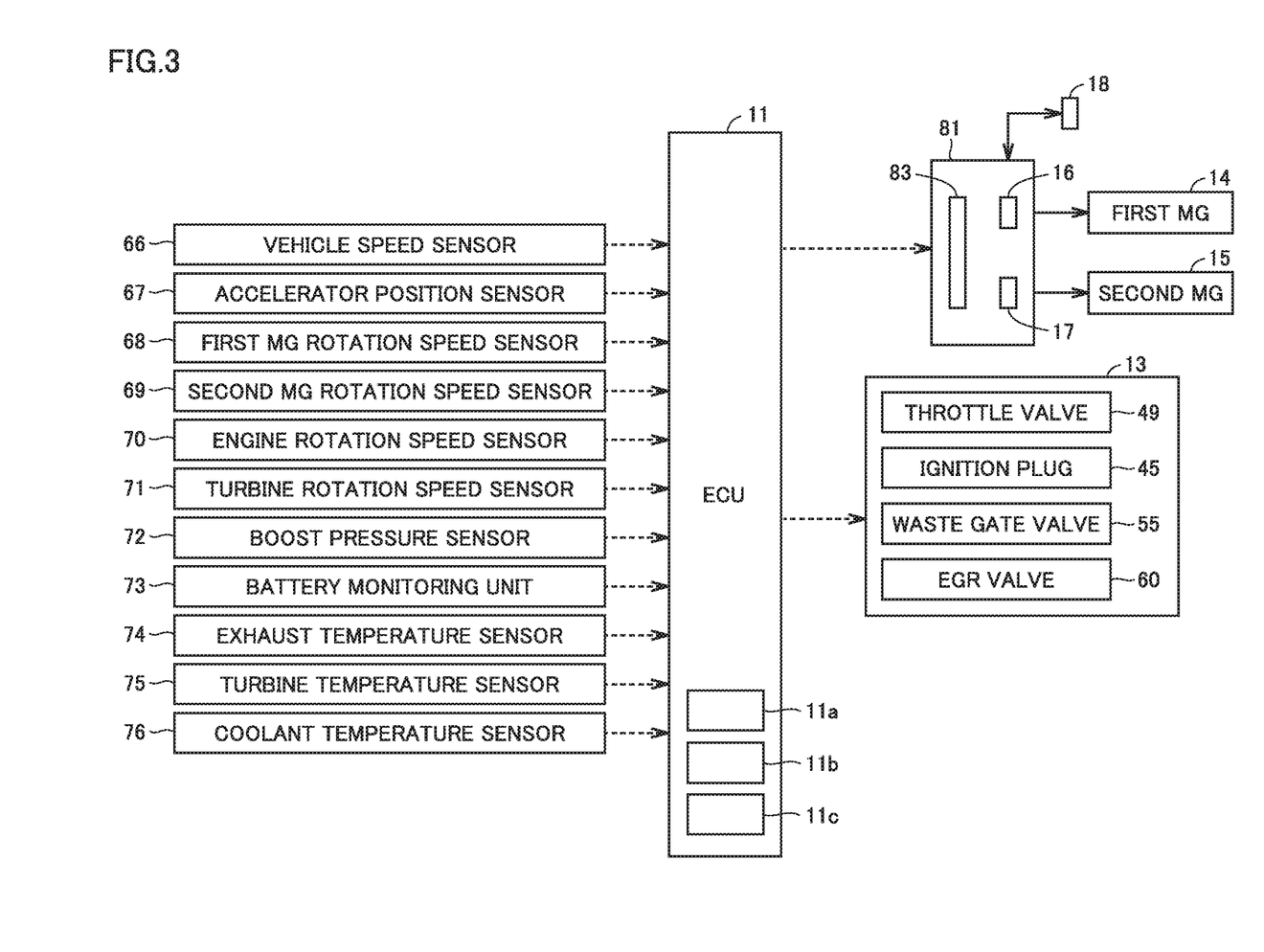

FIG. 3 is a diagram showing an exemplary controller (which is also referred to as an "electronic control unit (ECU)" below) of hybrid vehicle 10 shown in FIG. 1. ECU 11 includes an input and output apparatus that supplies and receives signals to and from various sensors and other devices, a storage 11a that stores various control programs or maps (including a read only memory (ROM) and a random access memory (RAM)), a central processing unit (CPU) 11b that executes a control program, and a counter 11c that counts time. Storage 11a can also separately be provided outside ECU 11.

ECU 11 controls operations by engine 13. ECU 11 controls first MG 14 and second MG 15 by controlling operations by PCU 81. Though an example in which ECU 11 according to the present embodiment is implemented as one device is described, ECU 11 may be implemented, for example, by a plurality of controllers. For example, ECU 11 may include an HV-ECU for control of engine 13, first MG 14, and second MG 15 in coordination, an MG-ECU for control of operations by PCU 81, and an engine ECU for control of operations by engine 13.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, exhaust temperature sensor 74 described above, a turbine temperature sensor 75, and a coolant temperature sensor 76 are connected to ECU 11.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of turbocharger 47. Boost pressure sensor 72 detects a boost pressure of engine 13. Turbine temperature sensor 75 detects a temperature of turbine 53. Coolant temperature sensor 76 detects a temperature of coolant for engine 13. Various sensors output signals indicating results of detection to ECU 11.

Battery monitoring unit 73 obtains a state of charge (SOC) representing a ratio of a remaining amount of charge to a full charge capacity of power storage 18 and outputs a signal indicating the obtained SOC to ECU 11. Battery monitoring unit 73 includes, for example, a sensor that detects a current, a voltage, and a temperature of power storage 18. Battery monitoring unit 73 obtains an SOC by calculating the SOC based on the detected current, voltage, and temperature of power storage 18. Various known approaches such as an approach by accumulation of current values (coulomb counting) or an approach by estimation of an open circuit voltage (OCV) can be adopted as a method of calculating an SOC.

<Control of Traveling of Vehicle>

Vehicle 10 can be set or switched to an HV traveling mode in which engine 13 and second MG 15 serve as motive power sources and an EV traveling mode in which the vehicle travels with engine 13 remaining stopped and second MG 15 being driven by electric power in power storage 18. Mode setting and mode switching are made by ECU 11. The EV traveling mode is selected, for example, in a low-load operation region where a vehicle speed is low and requested driving force is low, and in this mode, engine 13 is stopped and output torque of second MG 15 is used as a source of drive for traveling. The HV traveling mode is selected in a high-load operation region where a vehicle speed is high and requested driving force is high, and in this mode, combined torque of output torque of engine 13 and output torque of second MG 15 is used as a source of drive for traveling.

In the HV traveling mode, in transmitting torque output from engine 13 to drive wheel 24, first MG 14 applies reaction force to planetary gear mechanism 20. Therefore, sun gear S functions as a reaction force element. In other words, in order to apply output torque of engine 13 to drive wheel 24, first MG 14 is controlled to output reaction torque against output torque of engine 13. In this case, regenerative control in which first MG 14 functions as a generator can be carried out.

Specifically, ECU 11 determines requested driving force based on an accelerator position determined by an amount of pressing of the accelerator pedal or a vehicle speed and calculates requested power of engine 13 based on the requested driving force. ECU 11 variously controls each component of engine 13 such as throttle valve 49, ignition plug 45, waste gate valve 55, and EGR valve 60 based on calculated requested power.

ECU 11 determines based on calculated requested power, an operating point (a rotation speed and output torque) of engine 13 in a coordinate system defined by the rotation speed of engine 13 and output torque of engine 13. ECU 11 sets, for example, an intersection between an equal power line equal in output to requested power in the coordinate system and a predetermined operating line as the operating point of engine 13. The predetermined operating line represents a trace of variation in engine torque with variation in rotation speed of engine 13 in the coordinate system. The operating line is set, for example, by adapting the trace of variation in output torque of engine 13 high in fuel efficiency through experiments.

ECU 11 controls torque and the rotation speed of first MG 14 based on the operating point above. Torque and the rotation speed of first MG 14 can arbitrarily be controlled in accordance with a value of a fed current or a frequency thereof. In the HV traveling mode, ECU 11 controls also second MG 15 such that requested driving force determined in accordance with an accelerator position or a vehicle speed is output to output gear 21 (drive wheel 24).

When torque of engine 13 exceeds a prescribed level (a forced induction line) by pressing of the accelerator pedal, ECU 11 starts forced induction by turbocharger 47 to increase a boost pressure with increase in torque. Start of forced induction and increase in boost pressure are realized by controlling waste gate valve 55 in a closing direction. When there is no request for forced induction, waste gate valve 55 is fully opened.

<Control of Warm-Up of Catalyst>

In a state that a temperature of catalyst converter 56 (that is, a temperature of the three-way catalyst (which is also simply referred to as a "catalyst" below)) is low (for example, around a room temperature) as represented by a state at the time of start of engine 13, the catalyst is desirably warmed up and activated early. This is because the catalyst contained in catalyst converter 56 has such a characteristic that exhaust purification performance is varied by the temperature thereof.

Figure 4:
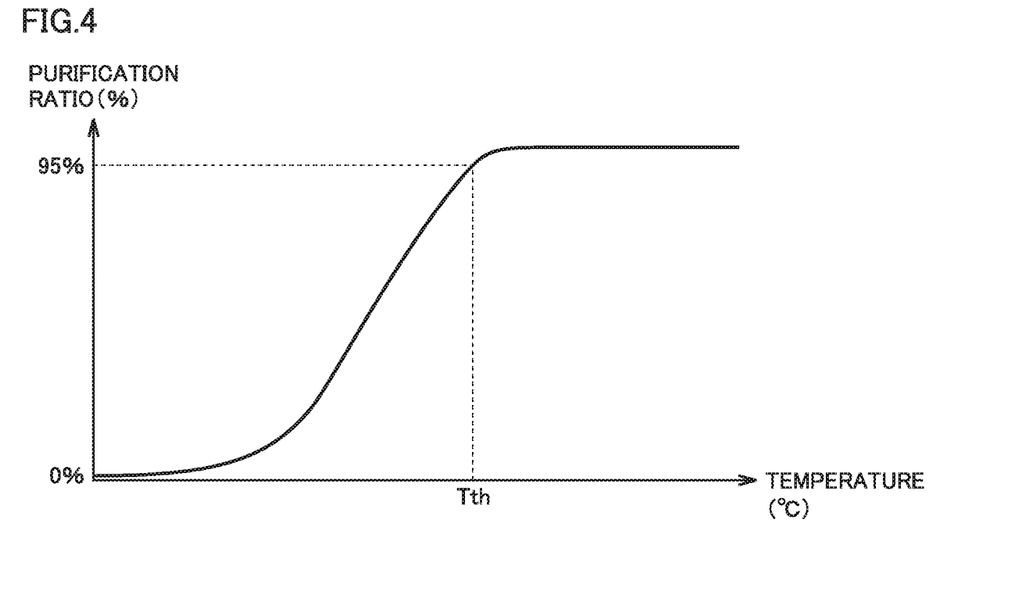
FIG. 4 is a characteristic diagram showing relation between a temperature of a catalyst contained in a catalyst converter and a purification ratio.

FIG. 4 is a characteristic diagram showing relation between a temperature (C.°) of a catalyst contained in catalyst converter 56 and a purification ratio (%). As shown in FIG. 4, the catalyst has such a characteristic that, when a temperature exceeds a threshold temperature Tth, it is high in purification ratio, and when the temperature is lower than threshold temperature Tth, it is low in purification ratio. In other words, the catalyst is activated when the temperature thereof exceeds threshold temperature Tth.

In order to warm up and activate the catalyst early, engine 13 may be turned on to warm up the catalyst with exhaust therefrom, which leads, however, to a problem as below.

For example, when engine 13 is turned on, exhaust emitted from cylinders 40a, 40b, 40c, and 40d of engine main body 40 flows from exhaust manifold 52 into exhaust passage 42 and flows into catalyst converter 56 from an upstream-side end surface of catalyst converter 56 provided in exhaust passage 42. Exhaust emitted from cylinders 40a, 40b, 40c, and 40d at this time does not necessarily evenly flow to the entire region of the upstream-side end surface of catalyst converter 56. Depending on positional relation between cylinders 40a, 40b, 40c, and 40d of engine 13 and exhaust manifold 52 or a shape of exhaust passage 42, there may be a region where a flow rate of exhaust that flows in is relatively high and a region where a flow rate of exhaust that flows in is relatively low. Therefore, in the upstream-side end surface of catalyst converter 56, there may be a region where the catalyst is not activated. Warm-up of catalyst converter 56 may thus be uneven.

Figure 5:
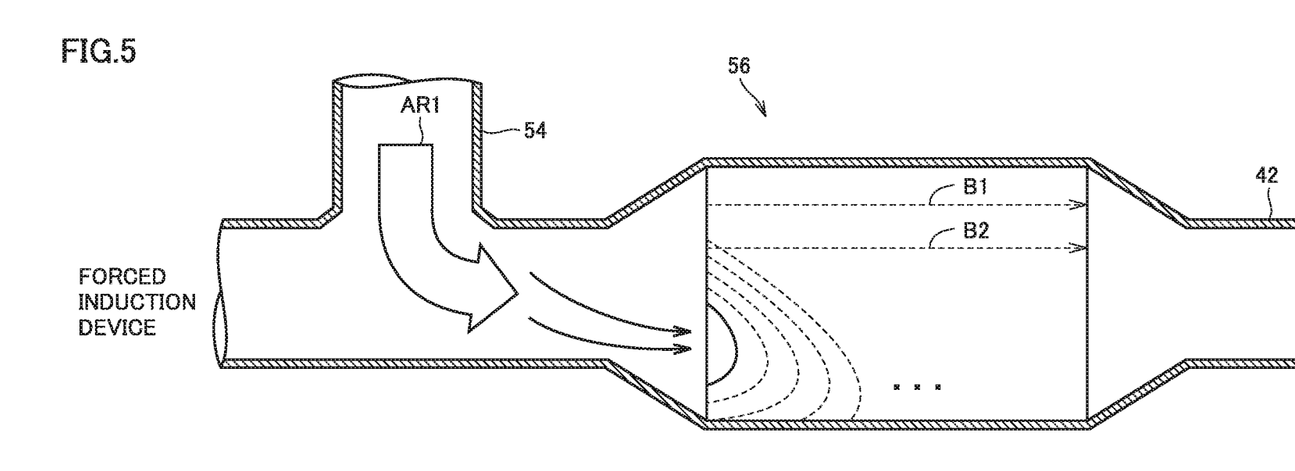
FIG. 5 is a diagram for illustrating an example where warm-up of the catalyst converter is uneven.

FIG. 5 is a diagram for illustrating an example where warm-up of catalyst converter 56 is uneven. FIG. 5 focuses on catalyst converter 56 and an area around the same in FIG. 2. FIG. 5 shows an example in which catalyst converter 56 is warmed up by exhaust at the time of start of engine 13. In the example shown in FIG. 5, waste gate valve 55 is fully opened.

When there are a region where a flow rate of exhaust that flows in is relatively high and a region where a flow rate of exhaust that flows in is relatively low, the catalyst in the region where a flow rate of exhaust that flows in is relatively high is mainly activated. Therefore, when warm-up of catalyst converter 56 is uneven, for example, as shown in FIG. 5, there are a region where the catalyst has been activated and a region where the catalyst has not been activated. For example, when the rotation speed of engine 13 or the flow rate of exhaust is varied in this state, exhaust may pass through the region where the catalyst has not been activated as shown with a dashed arrow B1. Alternatively, as shown with a dashed arrow B2, exhaust may pass through a region where there is less activated catalyst. In such a case, exhaust that passes is not appropriately purified and exhaust purification performance is low. Warm-up of catalyst converter 56 may be expedited by initially setting a high flow rate of exhaust emitted from engine main body 40 to increase a quantity of heat introduced into catalyst converter 56. In this case, however, a large amount of exhaust initially passes through the catalyst before it is activated, which leads to lowering in exhaust purification performance.

Vehicle 10 according to the present embodiment can carry out warm-up control for warming up catalyst converter 56 that includes first processing and second processing. Warm-up control is carried out by ECU 11. ECU 11 sequentially performs first processing and second processing.

In first processing, the catalyst in an upstream-side region of catalyst converter 56 is activated relatively uniformly while an amount of exhaust that passes through the catalyst that has not been activated is reduced by lowering the flow rate of exhaust. At the time point of activation of the catalyst in an amount allowing appropriate purification of exhaust at the time of start of second processing, switching from first processing to second processing is made. In second processing, the catalyst in the entire catalyst converter 56 is activated by making use of turbine 53 while the flow rate of exhaust is increased. First processing and second processing will specifically be described below.

Warm-up control is carried out when engine 13 is started and a temperature of catalyst converter 56 (a temperature of the catalyst) is estimated to be lower than threshold temperature Tth. Examples of the case that the temperature of the catalyst is estimated to be lower than threshold temperature Tth include a case that a certain period of time has elapsed since previous stop of engine 13 until start thereof at the present time and a case that a temperature of coolant for engine 13 is lower than a prescribed temperature.

<<First Processing>>

First processing aims to relatively uniformly activate the catalyst in the upstream-side region of catalyst converter 56 while the flow rate of exhaust is low.

Specifically, ECU 11 controls waste gate valve 55 to fully be opened while the ECU controls engine 13 to an idle state, that is, to a state that the flow rate of exhaust is low. In first processing, waste gate valve 55 is fully opened to bypass exhaust upstream from turbine 53 to a portion downstream from turbine 53. Therefore, turbine 53 is not rotated. Loss of thermal energy of exhaust by rotation of turbine 53 can thus be suppressed.

The reason why engine 13 is controlled to the idle state to lower the flow rate of exhaust is as set forth below. In the idle state, a target rotation speed (which is also referred to as an "idle rotation speed" below) of engine 13 is predetermined.

Initially, (1) an amount of exhaust that passes through the catalyst that has not been activated is decreased by lowering the flow rate of exhaust, so that lowering in exhaust purification performance can be suppressed. Then, (2) when the flow rate of exhaust from engine main body 40 is low, a flow velocity of exhaust that passes through bypass passage 54 and flows to catalyst converter 56 is low. When a flow velocity of exhaust is high, linearity thereof is high and hence exhaust may locally flow to the upstream-side end surface of catalyst converter 56, for example, as shown in FIG. 5. When the flow velocity of exhaust is low, exhaust flows in from the upstream-side end surface of catalyst converter 56 as spreading over a certain range. Therefore, the upstream-side region of catalyst converter 56 can relatively uniformly be warmed up.

Figure 6:
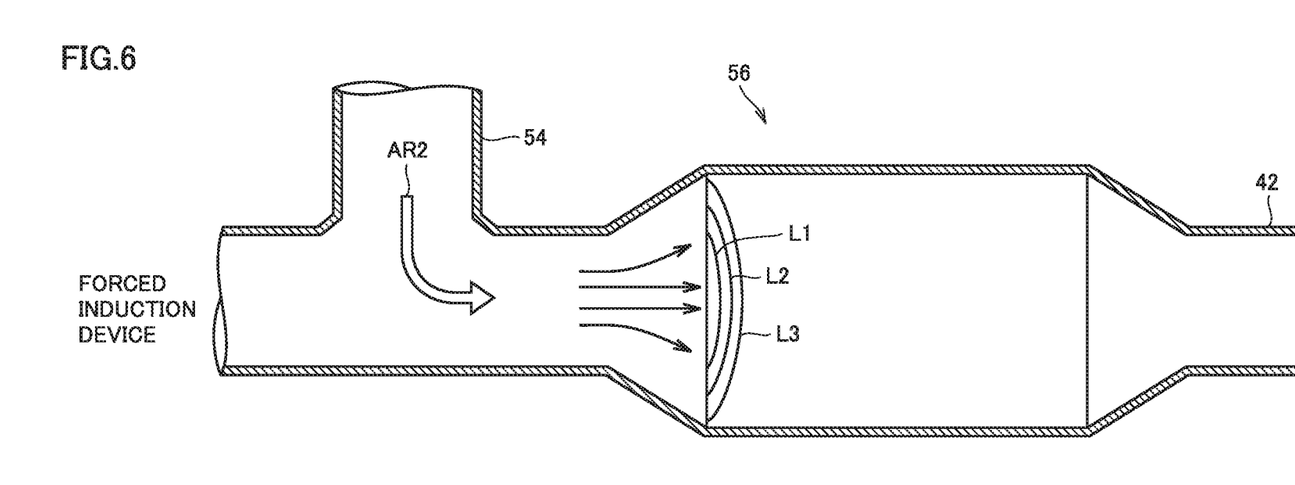
FIG. 6 is a diagram for illustrating a flow of exhaust in first processing.

FIG. 6 is a diagram for illustrating a flow of exhaust in first processing. A thickness of an arrow AR2 in FIG. 6 represents a flow rate of exhaust. Arrow AR2 in FIG. 6 can be seen to be smaller than an arrow AR1 in FIG. 5. Since engine 13 is controlled to the idle state in first processing, the flow rate of exhaust from engine main body 40 is low. Therefore, exhaust that flows from bypass passage 54 to catalyst converter 56 flows to the upstream-side end surface of catalyst converter 56 as spreading over a certain range as described above.

Thus, the region where the catalyst has been activated spreads, for example, in the order of a region surrounded by a solid line L1, a region surrounded by a solid line L2, and a region surrounded by a solid line L3 in FIG. 6. In first processing, the catalyst in the upstream-side region of catalyst converter 56 is activated as set forth above.

Waste gate valve 55 is not necessarily limitatively fully opened in first processing. Though the waste gate valve is desirably fully opened from a point of view of thermal energy of exhaust, at least a certain amount of exhaust that flows from exhaust manifold 52 into exhaust passage 42 should only be caused to flow into bypass passage 54. For example, waste gate valve 55 may be set to 80% or 90% opening.

<<Second Processing>>

ECU 11 performs second processing after it performs first processing for a first set time period (which will be described later) required for activation of the catalyst in the upstream-side region of catalyst converter 56. Second processing aims to activate the catalyst in the entire catalyst converter 56.

Specifically, ECU 11 increases the rotation speed of engine 13 to a prescribed rotation speed and controls waste gate valve 55 to fully be closed. The prescribed rotation speed refers to a rotation speed at which exhaust at a flow rate allowing rotation of turbine 53 can be emitted. Turbine 53 is thus rotated. As turbine 53 is rotated, exhaust flows to catalyst converter 56 as a swirl. As exhaust swirls, in spite of increase in flow velocity of exhaust, exhaust can flow to catalyst converter 56 without locally flowing. In other words, catalyst converter 56 can relatively uniformly be warmed up at the end surface from the upstream side and the catalyst in the entire catalyst converter 56 can be activated.

In order to increase the rotation speed of engine 13, ECU 11 controls first MG 14. Specifically, for example, when vehicle 10 remains stopped, the ECU increases the rotation speed of engine 13 by raising the rotation speed of first MG 14.

In second processing, when the rotation speed of engine 13 is increased, the flow rate of exhaust increases and catalyst converter 56 can be warmed up early. Since the catalyst in the upstream-side region of catalyst converter 56 has been activated in first processing, exhaust at the time of start of second processing can appropriately be purified. When second processing high in flow rate of exhaust is initially performed, much exhaust passes before activation of the catalyst and hence there is a concern about lowering in exhaust purification performance. By initially performing first processing and activating the catalyst in an amount allowing appropriate purification of exhaust at the time of start of second processing, high exhaust purification performance can be maintained.

Figure 7:
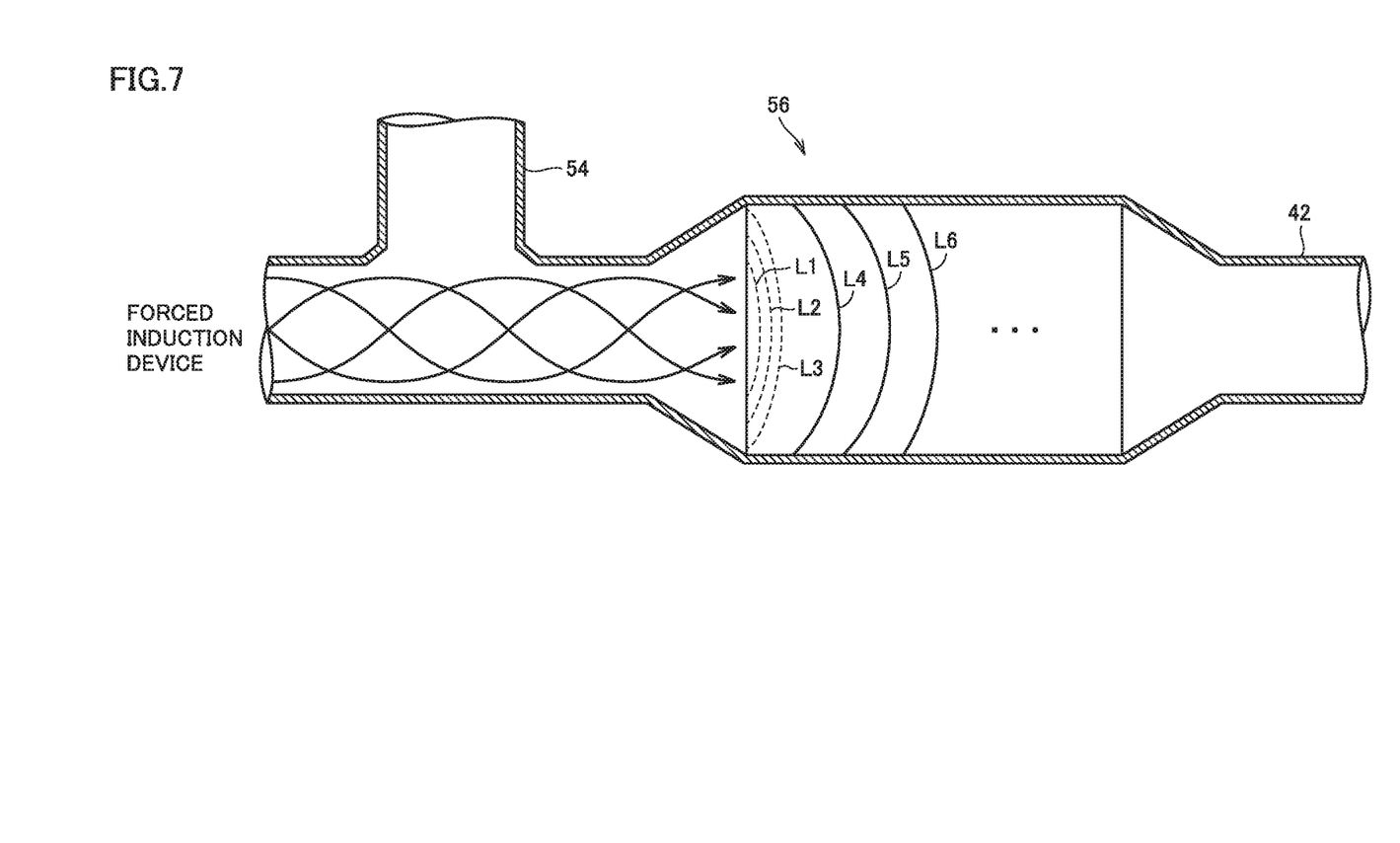
FIG. 7 is a diagram for illustrating a flow of exhaust in second processing.

FIG. 7 is a diagram for illustrating a flow of exhaust in second processing. FIG. 7 shows that a swirl of exhaust generated by rotation of turbine 53 flows to catalyst converter 56. By allowing a swirl of exhaust to flow to catalyst converter 56, exhaust flows to the upstream-side end surface of catalyst converter 56 without locally flowing.

Thus, the region where the catalyst has been activated spreads, for example, in the order of a region surrounded by a solid line L4, a region surrounded by a solid line L5, and a region surrounded by a solid line L6 in FIG. 7. As the catalyst is thus activated with unevenness being suppressed, the catalyst in the entire catalyst converter 56 can be activated.

Waste gate valve 55 is not necessarily limitatively fully closed in second processing. A swirl should only be generated by rotating turbine 53, and for example, waste gate valve 55 may be set to 10% or 20% opening.

<<Duration of First Processing (First Set Time Period)>>

The first set time period representing a duration of first processing is set, for example, to a time period required for activating, by performing first processing, the catalyst in an amount allowing appropriate purification of exhaust at the time of start of second processing. After start of second processing, the catalyst is activated as appropriate by exhaust that flows to catalyst converter 56 in second processing. Therefore, the first processing aims at appropriate purification of exhaust at the time of start of second processing.

A flow rate of exhaust in second processing can be derived in advance from a target rotation speed of engine 13 in second processing. By calculating an amount of catalyst to be activated based on the flow rate of exhaust at the time of start of second processing, the upstream-side region of catalyst converter 56 to be activated in first processing can be derived.

By deriving a quantity of heat required for activating the catalyst in that region, a time period within which that quantity of heat can be supplied in first processing can be set as the first set time period. Since the quantity of heat to be supplied to the catalyst in first processing can be calculated based on a temperature of exhaust and a duration of first processing, the first set time period representing the duration of first processing can be determined based on the quantity of heat to be supplied and the temperature of exhaust. Therefore, for example, by setting in advance the first set time period for each temperature of exhaust, the first set time period can be determined each time in accordance with a detection value from exhaust temperature sensor 74. When the temperature of exhaust at the time of start of engine 13 can be regarded as substantially constant, the first set time period can also uniquely be determined. In other words, the first set time period can be set based on the quantity of heat introduced into catalyst converter 56 in first processing. The first set time period corresponds to an exemplary "prescribed time period" according to the present disclosure.

<<Duration of Second Processing (Second Set Time Period)>>

A second set time period representing a duration of second processing is set to a time period within which the entire catalyst converter 56 can be warmed up by performing second processing. The second set time period is determined in advance, for example, based on a flow rate and a temperature of exhaust in second processing as well as specifications of catalyst converter 56 (specifically, a type or an amount of a catalyst carried on catalyst converter 56).

<Processing Performed by Controller>

Figure 8:
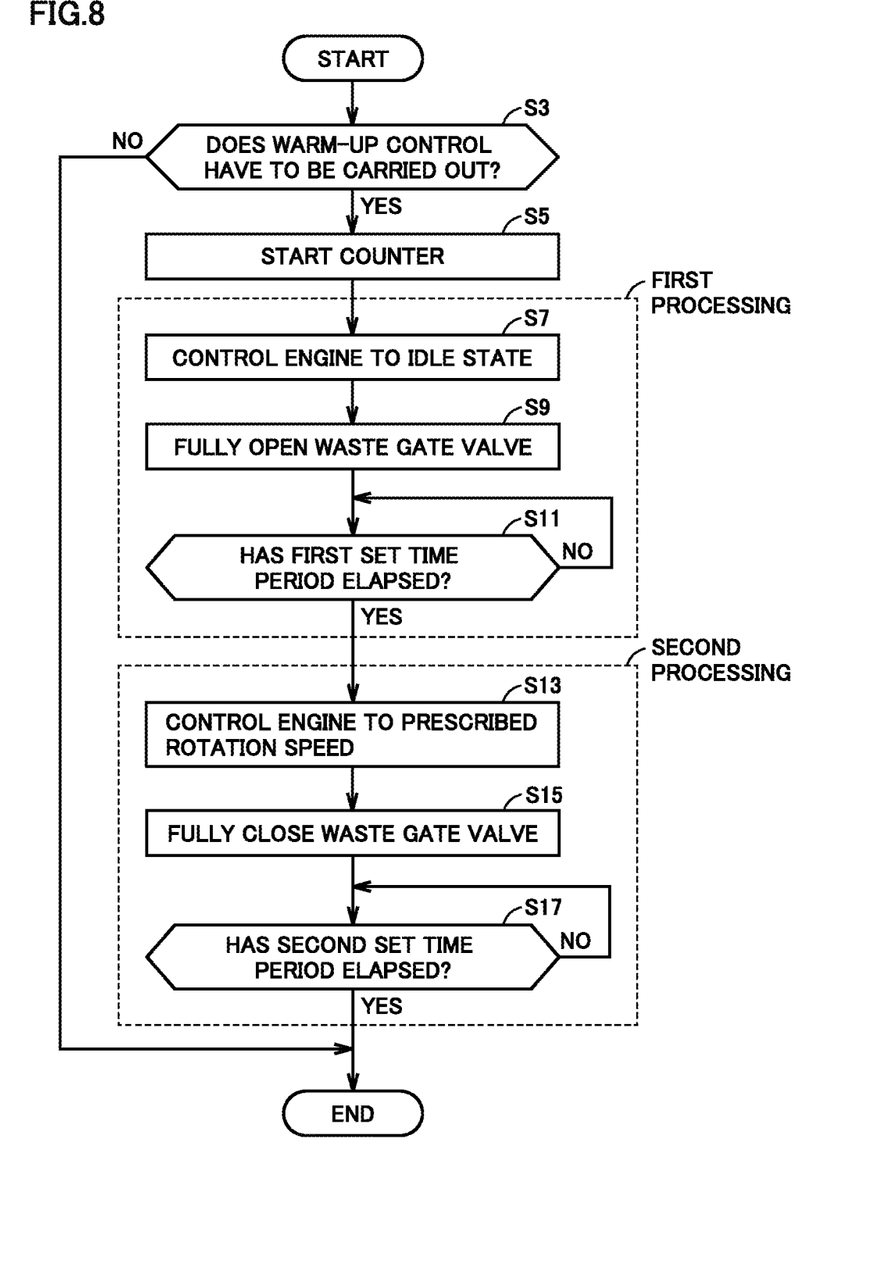
FIG. 8 is a flowchart showing a procedure in processing performed by the ECU.

FIG. 8 is a flowchart showing a procedure in processing performed by ECU 11. The flowchart is executed by ECU 11 each time engine 13 is started. Though an example in which steps (the step being abbreviated as "S" below) shown in FIG. 8 are performed by software processing by ECU 11 is described, some or all of them may be performed by hardware (electrical circuits) fabricated in ECU 11.

When engine 13 is started, ECU 11 determines whether or not warm-up control should be carried out (S3). Specifically, ECU 11 determines whether or not a certain time period has elapsed since previous stop of engine 13 until start thereof at the present time. In other words, in S3, processing for determining whether or not a temperature of the catalyst is estimated to be lower than threshold temperature Tth is performed. In S3, whether or not the temperature of the catalyst is estimated to be lower than threshold temperature Tth may be determined, for example, based on whether or not a temperature of coolant for engine 13 is lower than a prescribed temperature.

When the certain time period has not elapsed since previous stop of engine 13 until start thereof at the present time (NO in S3), ECU 11 determines that it is not necessary to carry out warm-up control and quits the process. When the certain time period has elapsed since previous stop of engine 13 until start thereof at the present time (YES in S3), ECU 11 starts warm-up control and starts time count by means of contained counter 11c (S5).

In warm-up control, ECU 11 initially performs first processing. Specifically, ECU 11 sets engine 13 to the idle state (S7) and fully opens waste gate valve 55 (S9). Exhaust that has flowed into exhaust passage 42 from exhaust manifold 52 thus passes through bypass passage 54 as bypassing turbine 53 and flows to catalyst converter 56. Since engine 13 is idle, the flow rate of exhaust is low and the flow velocity is low. Therefore, exhaust flows in from the upstream-side end surface of catalyst converter 56 as spreading over a certain range.

Then, ECU 11 determines whether or not the first set time period has elapsed (S11). When the first set time period has not elapsed (NO in S11), the catalyst in an amount allowing purification of exhaust at the time of start of second processing has not been activated and hence ECU 11 continues first processing.

When the first set time period has elapsed, it can be concluded that the catalyst in an amount allowing purification of exhaust at the time of start of second processing has been activated. Therefore, when the first set time period has elapsed (YES in S11), ECU 11 starts second processing. Specifically, ECU 11 sets the rotation speed of engine 13 to a prescribed rotation speed higher than an idle rotation speed (S13) and fully closes waste gate valve 55 (S15). Thus, exhaust that has flowed through bypass passage 54 as bypassing turbine 53 no longer flows through bypass passage 54 but flows through exhaust passage 42 and turbine 53 is rotated. As turbine 53 is rotated, a swirl of exhaust is generated. As the swirl of exhaust flows to catalyst converter 56, the catalyst in the entire catalyst converter 56 can be activated. Since the flow rate of exhaust is higher than in first processing, warm-up of catalyst converter 56 can be completed early.

ECU 11 determines whether or not the second set time period has elapsed since start of second processing (S17). Whether or not the second set time period has elapsed since start of second processing may be determined, for example, based on whether or not a third set time period (the sum of the first set time period and the second set time period) has elapsed since start of warm-up control. Whether or not the second set time period has elapsed since start of second processing may be determined by newly starting time count in switching from first processing to second processing.

When the second set time period has not elapsed since start of second processing (NO in S17), warm-up of the entire catalyst converter 56 has not been completed and hence ECU 11 continues second processing.

When the second set time period has elapsed since start of second processing, it can be concluded that warm-up of the entire catalyst converter 56 has been completed. Therefore, when the second set time period has elapsed since start of second processing (YES in S17), ECU 11 determines that warm-up of catalyst converter 56 has been completed, quits warm-up control, and quits the process.

As set forth above, in vehicle 10 according to the present embodiment, warm-up control including first processing and second processing is carried out in order to warm up catalyst converter 56. In first processing, the catalyst in the upstream-side region of catalyst converter 56 is relatively uniformly activated. Then, in second processing, the catalyst in the entire catalyst converter 56 can be activated by rotating turbine 53 to generate a swirl of exhaust and causing the swirl of exhaust to flow to catalyst converter 56.

When warm-up control is started while vehicle 10 remains stopped, vehicle 10 does not necessarily remain stopped during warm-up control. For example, driving force may be requested through an operation of the accelerator by a user while first processing in which the flow rate of exhaust is low is being performed. Even in such a case, the hybrid vehicle would be able to secure driving force by using electric power in power storage 18. Therefore, even when the flow rate of exhaust is lowered by continuing first processing, response to the operation of the accelerator by the user can be made and deterioration in drivability can be suppressed.

(Modification)

In the embodiment, the first set time period for which first processing is performed is set based on a quantity of heat supplied from exhaust to catalyst converter 56. Specifically, the first set time period is set to a time period required for activating, by performing first processing, the catalyst in an amount allowing appropriate purification of exhaust at the time of start of second processing. For example, however, a catalyst temperature sensor capable of detecting a temperature of the catalyst in the upstream-side region of catalyst converter 56 is provided. When a temperature of the catalyst in the upstream-side region of catalyst converter 56 exceeds threshold temperature Tth, first processing may be quitted and second processing may be performed.

Figure 9:
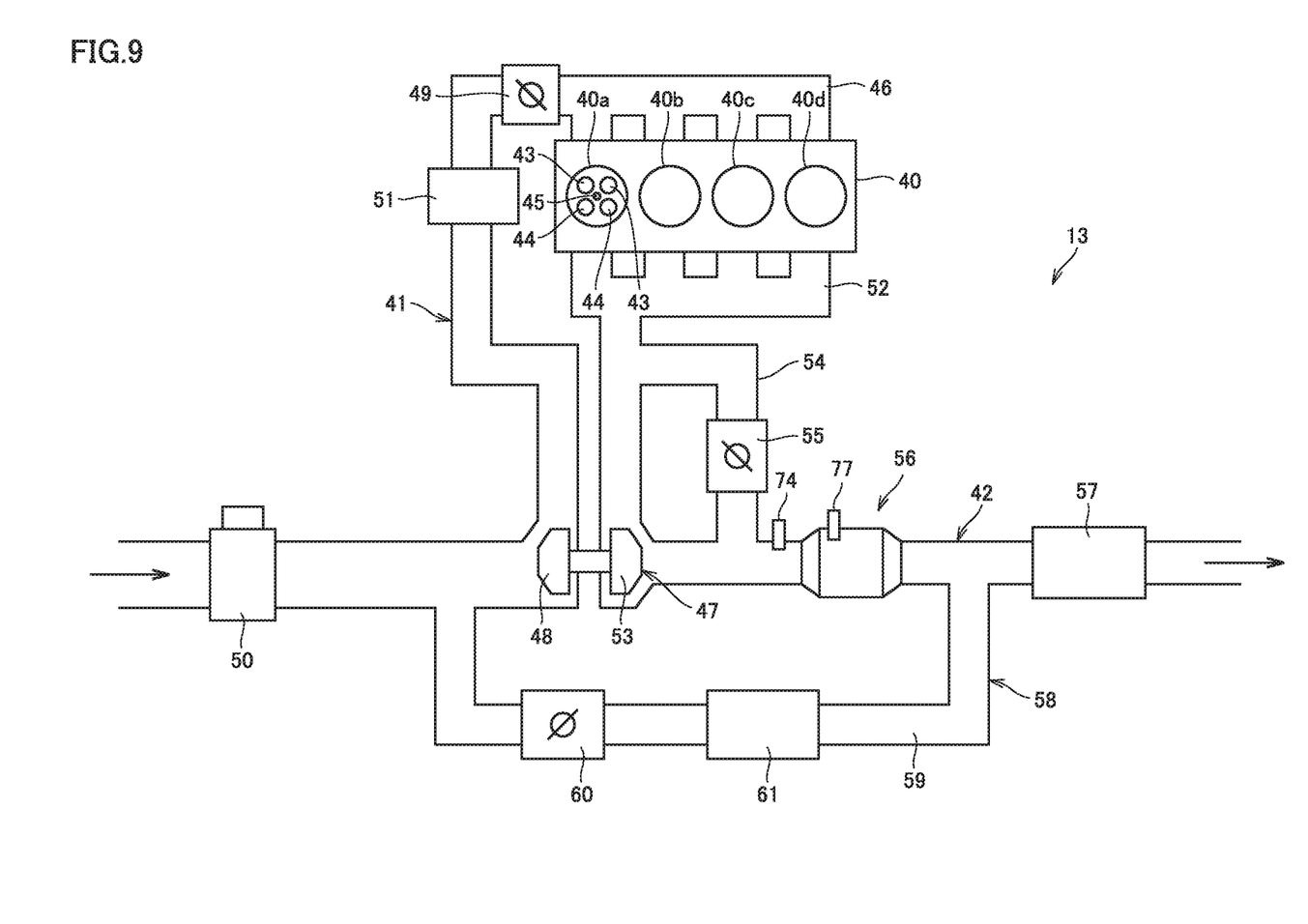
FIG. 9 is a diagram showing an exemplary configuration of the engine according to a modification.

FIG. 9 is a diagram showing an exemplary configuration of engine 13 according to a modification. FIG. 9 is different from FIG. 2 in additionally including a catalyst temperature sensor 77 capable of detecting a temperature of the catalyst in the upstream-side region of catalyst converter 56. Since FIG. 9 is otherwise the same as FIG. 2, description will not be repeated.

Catalyst temperature sensor 77 detects a temperature of the catalyst in the upstream-side region of catalyst converter 56 and outputs a signal representing a result of detection to ECU 11. More specifically, for example, catalyst temperature sensor 77 is provided to detect a temperature of the catalyst around a boundary between a region where activation is required for purification of exhaust at the time of start of second processing and a region otherwise.

When the temperature detected by catalyst temperature sensor 77 exceeds threshold temperature Tth, ECU 11 determines that the catalyst in an amount allowing appropriate purification of exhaust at the time of start of second processing has been activated, quits first processing, and starts second processing.

According also to the configuration in which switching between first processing and second processing is made based on a temperature detected by catalyst temperature sensor 77 as above, an effect the same as in the embodiment can be achieved.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
an internal combustion engine including a turbocharger;
a catalyst that purifies exhaust, the catalyst being provided in an exhaust passage downstream from a turbine of the turbocharger;
a bypass passage that is branched from the exhaust passage upstream from the turbine, bypasses the turbine, and is merged with the exhaust passage upstream from the catalyst;
a waste gate valve that regulates a flow rate of exhaust that flows through the bypass passage; and
a controller that performs warm-up control for warming up the catalyst at start of the internal combustion engine, wherein
the warm-up control includes a first processing and a second processing,
in the first processing, the controller sets the activated internal combustion engine to an idle state and controls the waste gate valve to a first opening, and
in the second processing after the first processing, the controller increases a rotation speed of the activated internal combustion engine from the rotation speed of the internal combustion engine in the idle state and rotates the turbine by controlling the waste gate valve to a second opening, the second opening being smaller than the first opening.

2. The hybrid vehicle according to claim 1, further comprising:
a rotating electric machine; and
a planetary gear mechanism to which the internal combustion engine, the rotating electric machine, and an output shaft are connected, wherein
in the second processing, the controller increases the rotation speed of the internal combustion engine by controlling the rotating electric machine.

3. The hybrid vehicle according to claim 1, wherein
the second processing is performed after the first processing is performed for a prescribed time period, and
the prescribed time period is set based on a quantity of heat introduced into the catalyst in the first processing.

4. The hybrid vehicle according to claim 1, further comprising a temperature
sensor that detects a temperature of the catalyst on an upstream side, wherein
when a detection value from the temperature sensor exceeds a threshold temperature during the first processing, the controller performs the second processing.

5. The hybrid vehicle according to claim 1, wherein the second opening is a position of the waste gate valve that is not completely closed.

* * * * *